(12) United States Patent
Bodechon

(10) Patent No.: US 10,875,750 B2
(45) Date of Patent: Dec. 29, 2020

(54) DEVICE FOR ACTUATING A MOBILE PLATFORM

(71) Applicant: LIFT'O, Entraigues sur la Sorgue (FR)

(72) Inventor: Antoine Bodechon, Entraigues sur la Sorgue (FR)

(73) Assignee: LIFT'O, Entraigues sur la Sorgue (FR)

(*) Notice: Subject to any disclaimer, the term of this patent is extended or adjusted under 35 U.S.C. 154(b) by 0 days.

(21) Appl. No.: 16/434,991

(22) Filed: Jun. 7, 2019

(65) Prior Publication Data
US 2020/0339396 A1    Oct. 29, 2020

(30) Foreign Application Priority Data
Apr. 24, 2019    (FR) ...................... 19 04331

(51) Int. Cl.
*B66F 3/06*    (2006.01)
*E04H 4/06*    (2006.01)

(52) U.S. Cl.
CPC ............... *B66F 3/06* (2013.01); *E04H 4/065* (2013.01)

(58) Field of Classification Search
CPC ...... B66F 3/06; B66F 3/10; B66F 1/06; E04H 4/065; A47B 9/00; A47B 9/12; A47B 9/20
USPC ....................... 108/147, 67, 144.11
See application file for complete search history.

(56) References Cited

U.S. PATENT DOCUMENTS

| 1,943,280 | A | * | 1/1934 | Arnold | A47B 9/04 108/147 |
| 2,574,657 | A | * | 11/1951 | Pierce | F16G 13/20 254/1 |
| 3,385,238 | A | * | 5/1968 | Jay | A47B 9/00 108/147 |
| 3,820,176 | A | * | 6/1974 | Feiertag | A61G 7/1019 5/611 |
| 4,593,874 | A | * | 6/1986 | Dunagan | A47B 9/04 108/147 |
| 4,718,355 | A | * | 1/1988 | Houghton | A47B 9/16 108/147 |
| 4,751,884 | A | * | 6/1988 | Ball | A47B 9/12 108/143 |
| 4,842,233 | A | * | 6/1989 | Rusin | A47C 3/24 108/147 |
| 4,981,085 | A | * | 1/1991 | Watt | A47B 9/02 108/146 |
| 5,088,421 | A | * | 2/1992 | Beckstead | A47B 9/12 108/147 |
| 5,102,375 | A | * | 4/1992 | Featherstone | B66F 3/06 227/99 |

(Continued)

FOREIGN PATENT DOCUMENTS

WO    2018024486 A1    2/2018

*Primary Examiner* — Jose V Chen
(74) *Attorney, Agent, or Firm* — Buchanan Ingersoll & Rooney PC

(57) ABSTRACT

The invention relates to an actuating device for an approximately horizontal mobile platform that is able to be set in movement in a vertical direction between a high position and a low position, and having a frame supporting the platform, said actuating device having at least one rigid chain actuated by at least one motor secured to the frame, and a guide member for guiding the rigid chain between a position substantially extended in the direction of the ground and a position substantially stowed parallel to the frame.

22 Claims, 8 Drawing Sheets

(56) References Cited

U.S. PATENT DOCUMENTS

| | | | | |
|---|---|---|---|---|
| 5,271,182 | A * | 12/1993 | Greisner | B66F 3/06 49/325 |
| 5,408,940 | A * | 4/1995 | Winchell | A47B 9/06 108/10 |
| 6,289,825 | B1 * | 9/2001 | Long | A47B 9/00 108/147 |
| 6,412,427 | B1 * | 7/2002 | Merkt | A47B 9/12 108/147 |
| 6,484,648 | B1 * | 11/2002 | Long | A47B 9/04 108/147 |
| 7,412,931 | B2 * | 8/2008 | Seidl | A47B 9/02 108/147 |
| 8,096,007 | B2 * | 1/2012 | Dyreby | A47B 9/20 108/147 |
| 2010/0223901 | A1 * | 9/2010 | Ando | F16G 13/20 59/82 |
| 2011/0048291 | A1 * | 3/2011 | Long | A47B 9/02 108/147 |
| 2012/0167542 | A1 * | 7/2012 | Oitaka | B66F 3/06 59/85 |
| 2013/0205927 | A1 * | 8/2013 | Saji | F16G 13/20 74/30 |
| 2015/0285430 | A1 * | 10/2015 | Wang | F16M 11/18 248/188.5 |
| 2015/0320198 | A1 * | 11/2015 | Zebarjad | A47B 9/20 108/147 |
| 2018/0319610 | A1 * | 11/2018 | Kauhanen | B65G 67/24 |

* cited by examiner though unlimited in scope of application, it is particularly useful in the field of mobile platforms arranged in basins such as swimming pools.

DEVICE FOR ACTUATING A MOBILE PLATFORM

The present invention relates to the field of devices for vertically actuating mobile platforms intended to receive a load, notably people or equipment. This actuating device finds a particular application, without being limited thereto, in the field of mobile platforms disposed in basins, such as swimming pools for example.

PRIOR ART

A wide variety of devices for actuating a platform in a vertical direction exist. Thus, systems of hydraulic cylinders positioned under the platform, or endless-screw systems, or deformable-parallelogram systems, in the manner of a car jack, are known.

In the field of devices for actuating a platform disposed in or above a basin, notably a swimming pool basin, there are numerous additional constraints that do not make it possible to use these conventional systems because they take up too much space, are difficult to access from outside the basin, or have components or controls that are incompatible with the aqueous and corrosive environment of the basin.

In the specific field of mobile platforms for swimming pool basins, specific systems have therefore been developed, such as the ones described for example in the document WO 2018/024486 A1. Said document describes a load-bearing structure device for a basin, having under its lower face, on the basin side, a mobile stand that is extended to support the load-bearing structure when the latter is in a high position. This provision does not make it possible to stop the load-bearing structure at any height in the basin. Moreover, inflatable balls disposed under the load-bearing structure act as floats. They are inflated to raise the structure to the surface of the basin and deflated in order to allow the structure to sink into the water under its own weight. This requires the presence of hoses supplying the balls with air. Moreover, the movements of the structure suffer from a long lag time, given the time that is necessary, starting from the command, to inflate or deflate the balls.

AIM OF THE INVENTION

The general aim of the invention is to provide a novel, more effective type of system for actuating a mobile platform intended to receive a load, for example, but without any limitation, a load-bearing structure covering a basin, notably a swimming pool basin.

In particular, the specific aim of the invention is to provide a system capable of setting a load-bearing structure in vertical movement without a significant lag time, and of stopping the structure not just in the high position or in the low position but also at any desired intermediate position.

Another aim of the invention is to provide a powerful, robust and stable actuating device that does not have a folding stand.

Another aim of the invention is to provide an actuating device, which, when it is used in a basin, only bears on the bottom of the basin, which is adaptable to all basin shapes, and which is compatible with corrosive environments such as the chlorinated water or salt water of swimming pools.

SUMMARY OF THE INVENTION

In principle, the present invention consists in integrating into a platform that is mobile in a vertical direction an assembly of rigid chains having load-bearing links, which are actuated by motors and which are designed to be able either to be integrated into the platform in a low position of the latter or to be extended out of the platform by being directed toward the ground, so as to lift and support the platform.

Therefore, the first subject of the invention is an actuating device for an approximately horizontal mobile platform that is able to be set in movement in a vertical direction between a high position and a low position, and having a frame supporting the platform, said actuating device having at least one rigid chain actuated by at least one motor secured to the frame, and a guide member for guiding the rigid chain between a position substantially extended in the direction of the ground and a position substantially stowed parallel to the frame.

According to one embodiment, said guide member for guiding the rigid chain is a guide casing that is integrated in the frame and has a curved guide ramp, one end of which is oriented horizontally in order to guide one end of the rigid chain parallel to the frame and to guide the other end of the rigid chain perpendicularly to the frame.

Preferably, the frame has at least one hollow profile section in which one end of the chains is stowed, the other end being directed toward the ground.

According to one advantageous embodiment, the rigid chains or thrust chains are made up of links that are juxtaposed and arranged such that the chain can be deformed between a straight extended position in which it is load-bearing and a position folded up inside the frame.

According to one embodiment, each link of the rigid chain has a body that is approximately in the shape of a fork and is provided with a heel connected by a base to two parallel flanges separated by a space intended to receive the heel of an adjacent link, the heel and each flange of a link having an orifice configured to receive a joint rotary pin for articulating a given link with respect to an adjacent link of the rigid chain.

In order to absorb and distribute the compression force, each link of the rigid chain has, on either side of the heel, two parallel shoulders configured to form a stop with respect to the ends of the flanges of an adjacent link.

Advantageously, the end faces of the flanges of the links are parallel to the faces of the shoulders and perpendicular to the compression force that is exerted on the links in the working position of the rigid chain.

According to one embodiment, the articulation of two adjacent links is possible in an angular range limited to 90°.

According to one embodiment, each flange and the heel of the links have an approximately rectangular shape with a rounded corner situated in the vicinity of the rotary pin of the link.

Preferably, in order to ensure a fluid articulation between the links, the distances between the rotary pin and the two perpendicular sides of the flanges and the two perpendicular sides of the heel of a link that are adjacent to the rotary pin are the same.

Moreover, the radius of curvature of the rounded corners of the flanges and of the heel of a link is greater than the distance between the rotary pin and the two perpendicular sides of the link that are adjacent to the rotary pin.

The rotary pin of a link is perpendicular to the main plane of symmetry of the link, and offset toward the rear side of the link.

Preferably, the heel of a link has an orifice that receives a threaded fastening screw, the end of which is fitted into a tapped orifice in the rotary pin so as to secure the body of the link and the rotary pin thereof in terms of rotation.

When the actuating device is intended to be used in a corrosive environment, the body of the links is made of plastics material or of synthetic resin mixed with reinforcing fibers, notably glass fibers. Moreover, the rotary pin of the links and the fastening screw thereof are made of stainless steel.

According to a simple embodiment, the rigid chain has a linear assembly of unitary links assembled such that the heel of one link is fitted into the space situated between the flanges of an adjacent link, the rotary pin being inserted into the orifices in the flanges of a link and the orifice in the heel of the adjacent link.

According to another, even more stable embodiment, the rigid chain has a linear assembly of chain elements made up of several unitary links assembled in parallel on a single rotary pin, a part of the rotary pin remaining free in order to allow engagement with a sprocket for driving the chain.

According to one embodiment of the actuating device according to the invention, the sides of the frame have elements for guiding the vertical movement of the platform along the walls of a basin, said elements being made up of brushes provided with bristles made of rot-proof plastics material. In this way, the frame cannot rub against the walls of the basin and the integrity of said walls is preserved.

According to an embodiment that is adapted to humid or corrosive environments, the profile sections of the frame are made of synthetic resin reinforced with glass fibers. The drive motors of the chains are sealed with a level of sealing in accordance with the standard IP68.

According to one embodiment, the driveshaft of the motor(s) is rotationally coupled to sprockets that mesh with the links or the rigid chain elements.

The platform and the frame may have any shape that is adapted to the shape of a basin, for example a rectangular, square or free shape.

A further subject of the invention is a basin having an actuating device for a mobile platform as described above.

DETAILED DESCRIPTION

The invention will be described in more detail with reference to the appended figures, in which.

DETAILED DESCRIPTION

Identical elements bear the same references throughout the figures.

Figure 1:
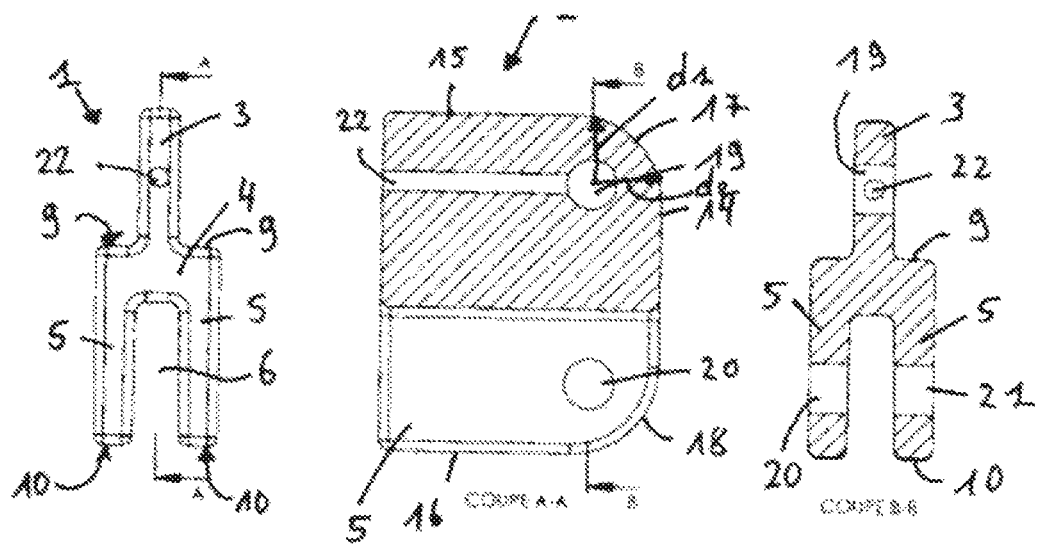
FIG. 1 shows elevation and sectional views of a unitary chain link used in the scope of the invention.

Reference is made to FIG. 1. The left-hand part of FIG. 1 shows a front elevation view of a unitary link 1 of a rigid chain used according to the invention. This link has an approximately fork-shaped body 2. It is provided with a heel 3 connected by a base 4, perpendicular to the heel, to two parallel flanges 5 separated by a space 6 intended to receive the heel 3 of an adjacent link 1.

The heel 3 and each flange 5 have an orifice configured to receive a joint rotary pin 7 (not shown in this figure) for articulating a link with respect to an adjacent link.

The heel 3 and the flanges 5 have a generally parallelepipedal shape. The link 1 is symmetric with respect to a main plane of symmetry 8 passing through the median plane of the heel 3 and to the middle between the two flanges 5.

The base 4 has, on either side of the heel 3, two parallel shoulders 9 that are configured to form a stop with respect to the end faces 10 of the flanges of an adjacent link, when these two links are aligned. It is this stop that makes it possible to lock the links together and to absorb the compression forces to which they will be subjected.

To this end, the end faces 10 of the forks of the link are parallel to the faces of the shoulders 9 and perpendicular to the compression force that is exerted on the links in the working position, in a direction parallel to the main plane of symmetry 8.

As can be seen in the central part of FIG. 1, which corresponds to a sectional view A-A of the link, the link 1 has, in this direction, an approximately rectangular shape that is delimited by sides 13, 14, 15, 16 but has two rounded corners 17, 18. The body 2 thus has a front side 13 and a rear side 14, an upper side 15 and a lower side 16, in the orientation shown. Orifices 19, 20, 21 that have the same diameter and are aligned in a line parallel to the rear side 14 and adjacent thereto are formed in the body 2 and intended to receive a rotary pin 7. The axis of the various orifices 19, 20, 21 is perpendicular to the main plane of symmetry 8 of the link and offset toward the rear side 14 of the link.

The orifice 19 is formed in the heel 3 of the link, and the orifices 20, 21 are formed in the flanges 5, as can be seen in the right-hand part of FIG. 1, which corresponds to a sectional view of the link on the section plane denoted B-B passing through the center of the orifices 19, 20, 21.

Preferably, the distances d1, d2 between the center of the orifices 19, 20 and the sides 14, 15, 16 of the flanges which are next to said orifices are all the same. Moreover, the centers of the rounded portions 17, 18 correspond respectively to the centers of the orifices 19, and (20, 21). Furthermore, the radii of curvature of the rounded portions 17, 18 are greater than the radius of the various orifices 19, 20, 21. This ensures that the rotation of two adjacent links is limited to an angular range of between 0° and 90°, the angle of 0° corresponding to the aligned position of the links, and thus to the stable working position of the chain.

According to a preferred embodiment of the link 1, the heel 3 also has a tapped orifice 22 that receives a threaded fastening screw (not shown), the end of which is fitted into a tapped orifice (not shown) formed in the rotary pin 7 so as to secure the body 2 of the link and the rotary pin 7 thereof in terms of rotation.

According to an advantageous embodiment, the body 2 of the link 1 is made of plastics material mixed with reinforcing fibers, notably glass fibers, in a quantity to be determined depending on the desired mechanical strength.

In order for the link 1 to be able to be used without being damaged in a corrosive environment, it is useful for the rotary pin 7 and the fastening screw fitted therein to be made of stainless steel or some other corrosion-resistant material.

Several manufacturing methods are conceivable for manufacturing the body 2 of the link according to the invention. For economic, high-volume production, a method of injecting the plastics material charged with fibers into a mold and then demolding the parts after curing could be used. Alternatively, it may be possible to use techniques, known per se, of rotational molding, 3D printing, machining, or assembly of a heel 3, a base 4 and added flanges 5.

Figure 2:
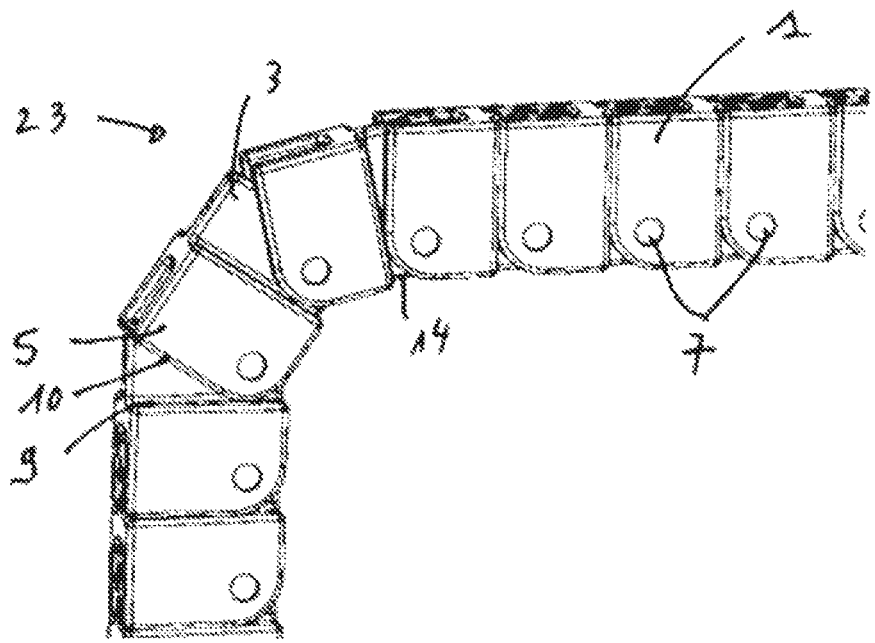
FIG. 2 shows a perspective view of a rigid chain formed by unitary links according to FIG. 1.

As shown in FIG. 2, in order to obtain a rigid chain 23 with links 1, it will be sufficient to produce a linear assembly of links 1 as described above, ensuring that the heel 3 of a given link is fitted into the space 6 between the flanges 5 of an adjacent link, and then to position and secure a rotary pin 7 in the orifices 20, 21 of one link and the orifice 19 of an adjacent link. The rotary pins 7 could protrude beyond at least one side of the links, so as to allow engagement with a gearwheel for driving the chain 23 thus formed, for example in a vertical movement for lifting a mobile load-bearing structure.

In operation in a working position, the faces 10 of the flanges of a given link butt against the shoulders 9 of an adjacent link, thereby ensuring a sufficient contact area for absorbing the compression force.

The fact that the rotary pins 7 are offset toward the rear side 14 of the chain, toward which the chain can be curved, ensures stable locking of the chain when it is in a straight position.

Figure 3:
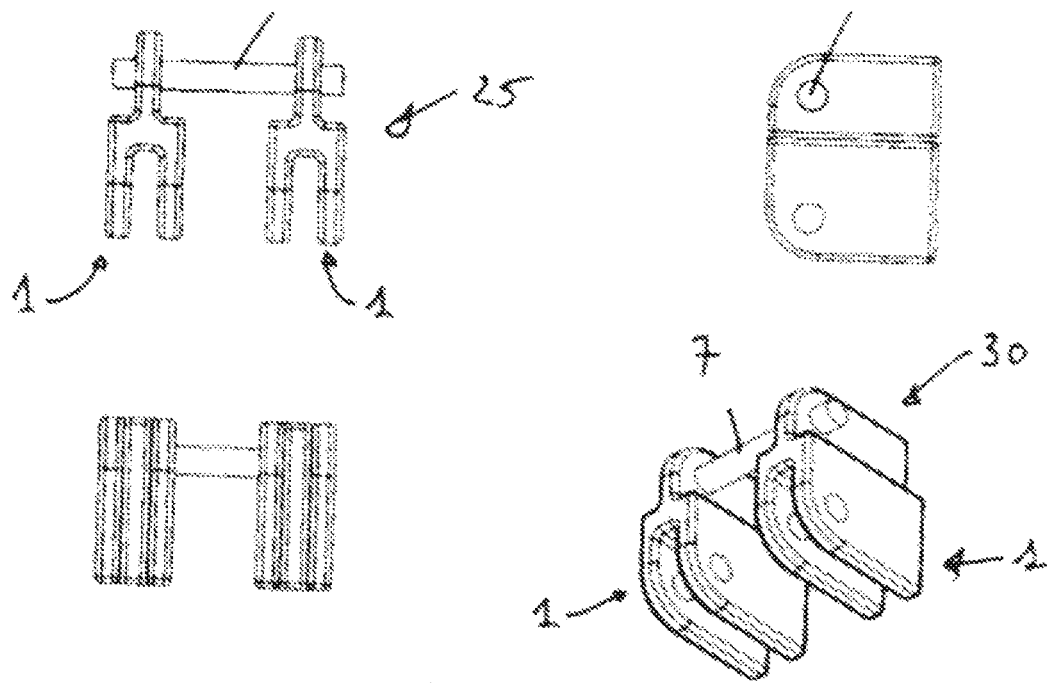
FIG. 3 shows elevation and perspective views of a chain element formed by two unitary links according to FIG. 1.
Figure 4:
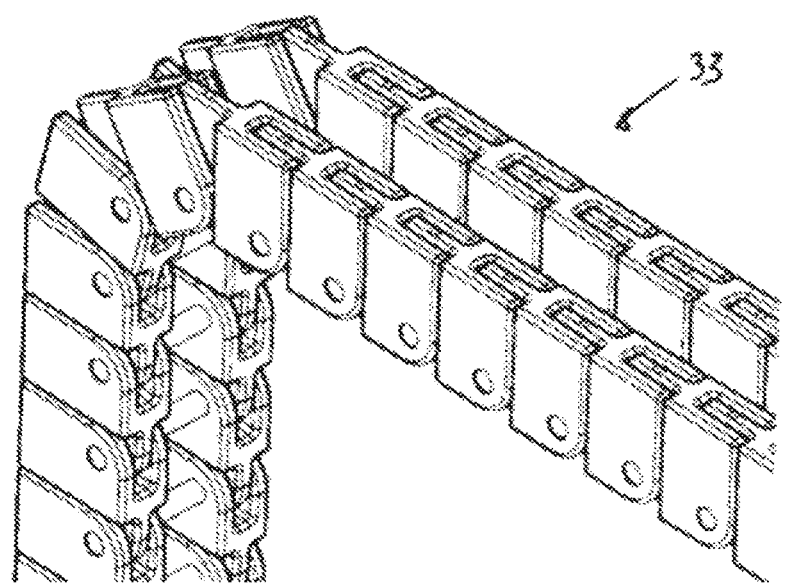
FIG. 4 is a perspective view of a rigid chain formed by chain elements according to FIG. 3 that is usable in the actuating device according to the invention.
Figure 7:
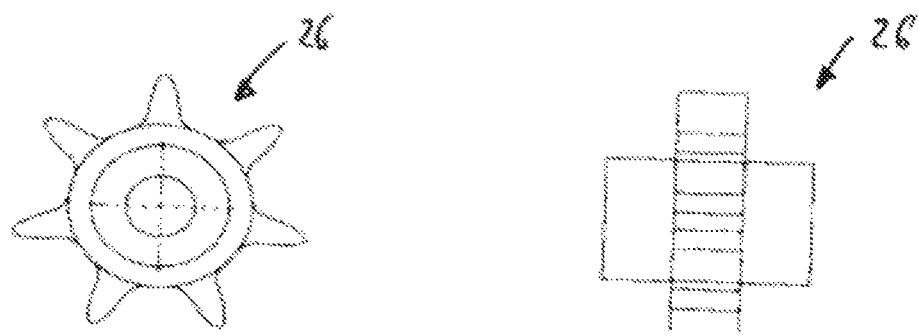
FIG. 7 shows side and front views of a gearwheel that is usable to drive the rigid chains according to FIGS. 4 and 6.

FIGS. 3 and 4 show an embodiment variant which uses chain elements 25 that are each made up of two unitary links 1, as described above, mounted on a single rotary pin 7. The part of the pin 7 situated between the two links 1 remains free so as to allow driving by the sprocket 26 of a gear mechanism, as shown in FIG. 7. The drive of the sprocket is not shown.

Figure 6:
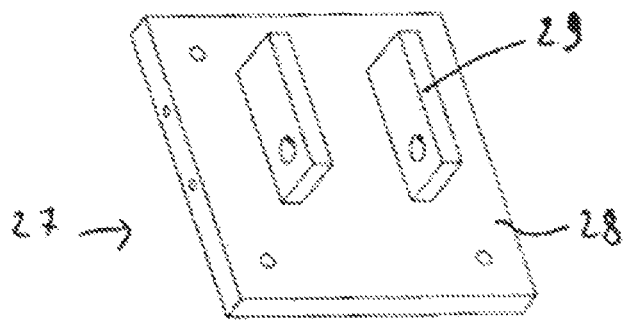
FIG. 6 shows a perspective detail view of the foot of the rigid chain according to FIG. 5.

In order to form a chain 33 as shown in FIG. 6, all that is necessary is to assemble the chain elements 25 in a linear manner.

This provision makes it possible to reinforce and stabilize the chain thus formed even further, but without changing the configuration of each unitary link 1.

Of course, if necessary, it is possible to mount more than two links 1 on one and the same pin 7, thereby further increasing the stability of the chain 33 with respect to any lateral forces.

Figure 5:
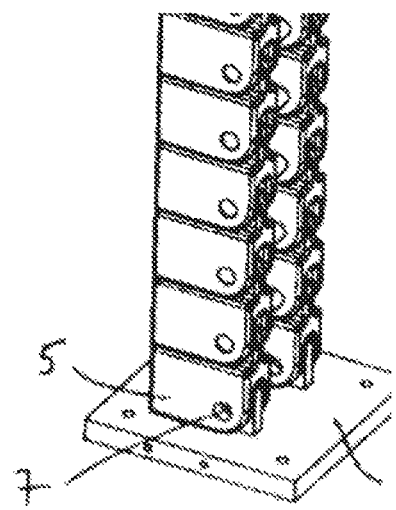
FIG. 5 shows a perspective view of one end of a rigid chain according to FIG. 4, provided with a foot.
Figure 11:
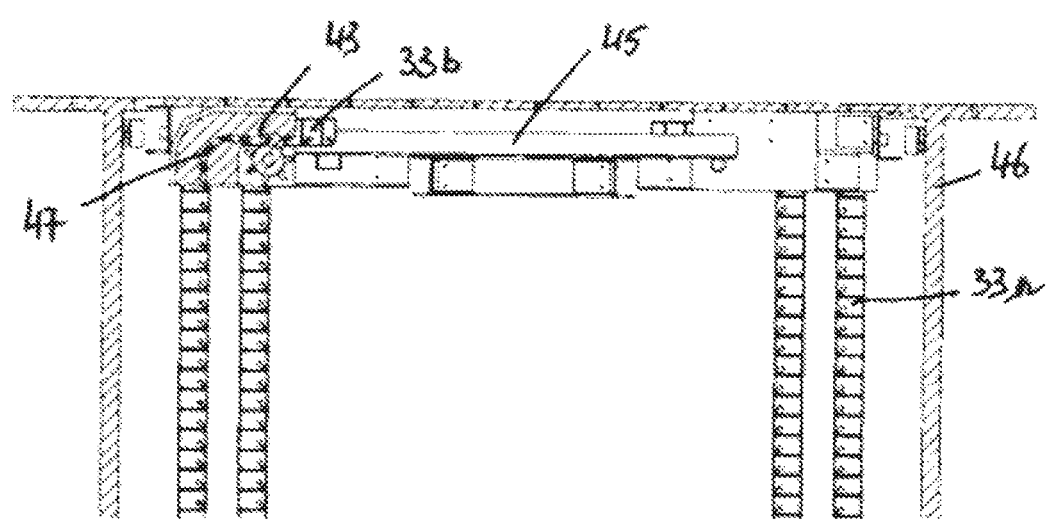
FIG. 11 shows a sectional view of a basin provided with a mobile load-bearing platform and an actuating device according to the invention.
Figure 12:
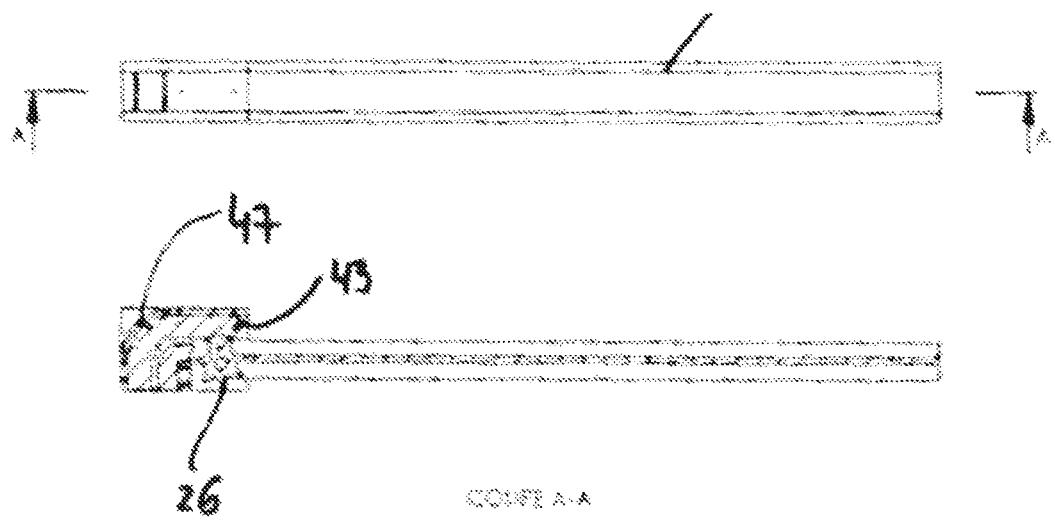
FIG. 12 shows a plan view and a sectional view of a guide rail for the chain of the actuating device according to the invention.
Figure 13:
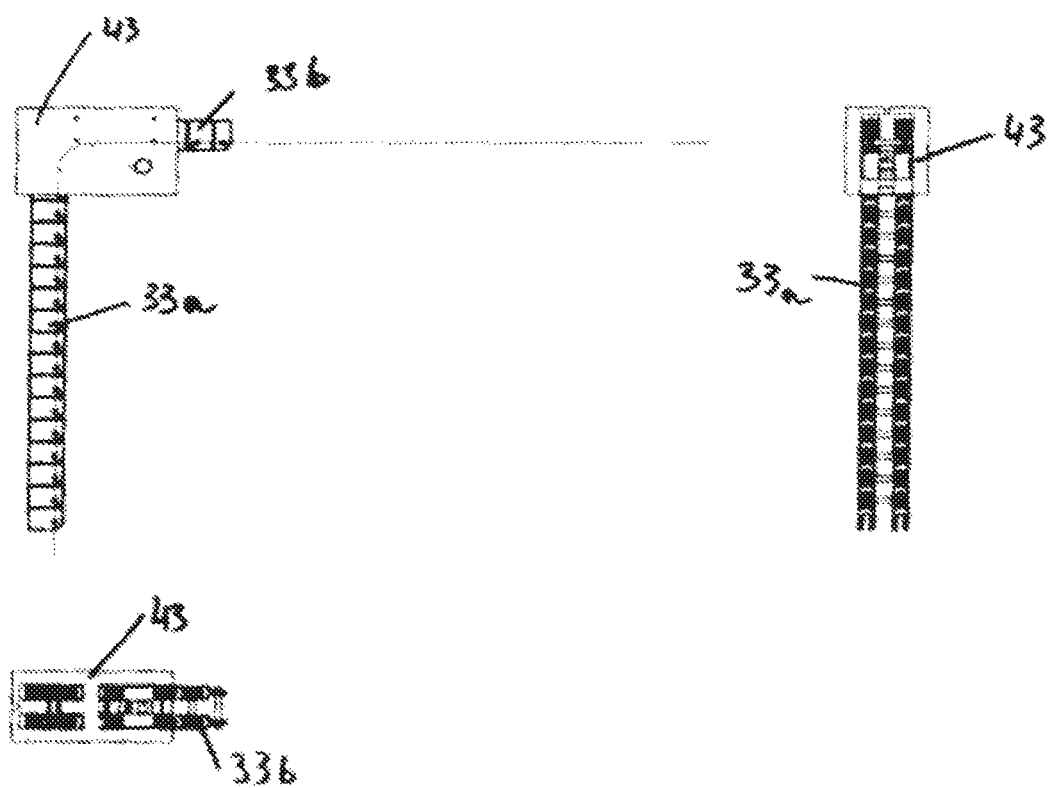
FIG. 13 shows top, front and side views of a rigid chain and of a chain guide casing of the actuating device according to the invention.
Figure 14:
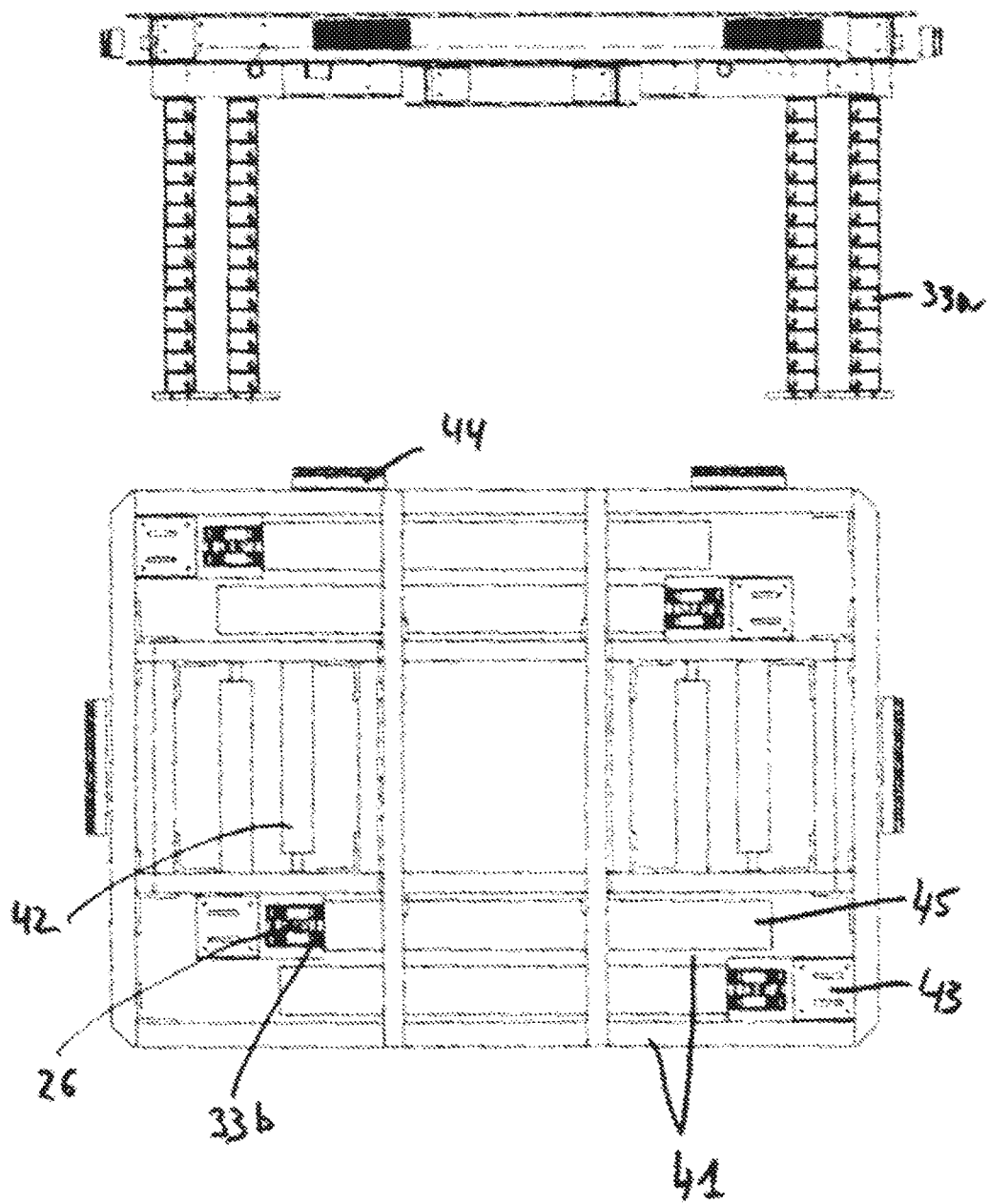
FIG. 14 shows a lateral side view and a top view of the actuating device according to the invention, in the extended position.
Figure 15:
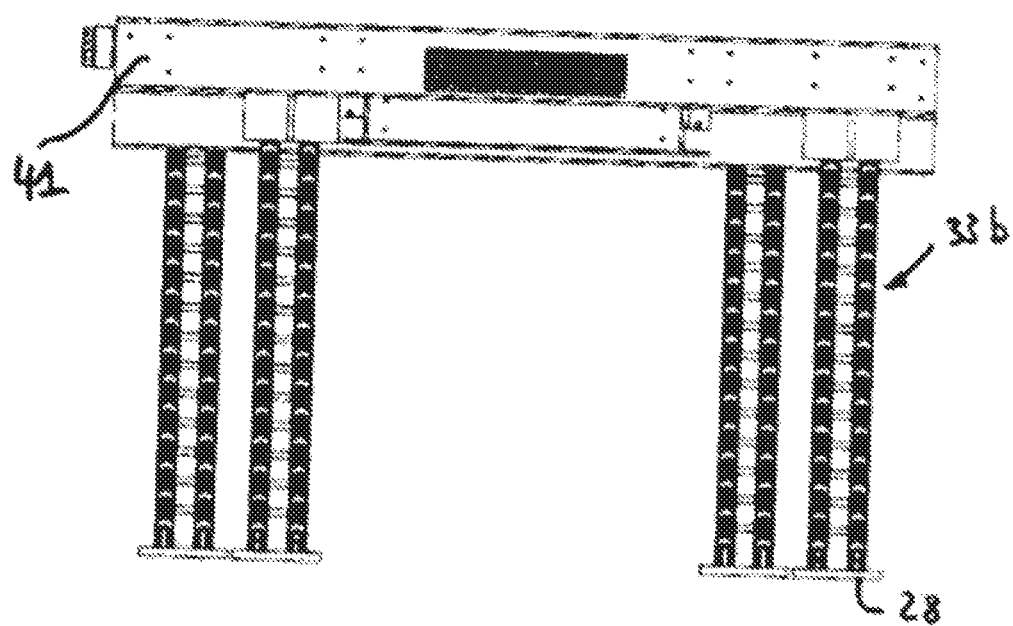
FIG. 15 shows a longitudinal side view of the actuating device according to the invention, in the extended position.

In order to increase the stability of the chain 23, 33 in the working position, it may be useful to provide one or both of its ends with a foot 27. In the example shown in FIG. 5, which corresponds to a chain 33 used to lift a mobile platform above a basin as shown in FIG. 11, this foot 27 is applied to the bottom of the basin, thereby increasing the coefficient of friction between the end of the chain 33 and the bottom.

As shown in FIG. 6, the foot 27 will usefully have a base 28 with an area greater than the section of the chain 23, 33. This base 28 is secured to heels 29 which are fitted between the flanges 5 of the last link(s) 1 of the chain, to which they are fastened by a pin 7 identical to the other pins 7 of the chain.

Figure 8:
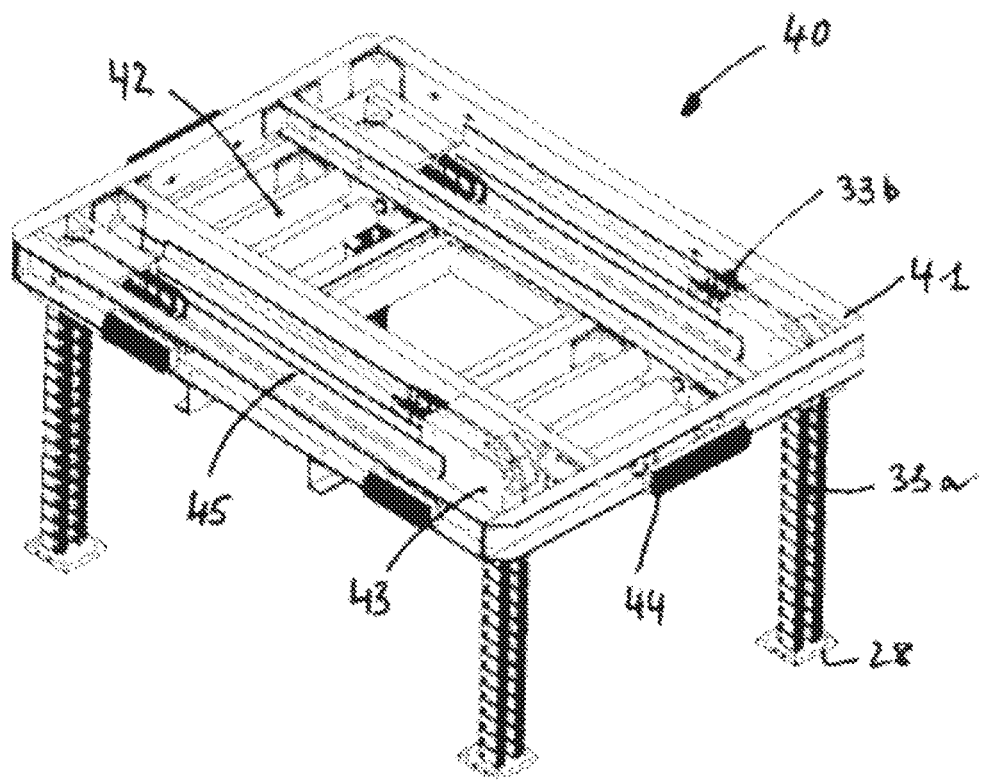
FIG. 8 shows a perspective view of an example of a device for actuating a mobile platform according to the invention, in the high position.
Figure 9:
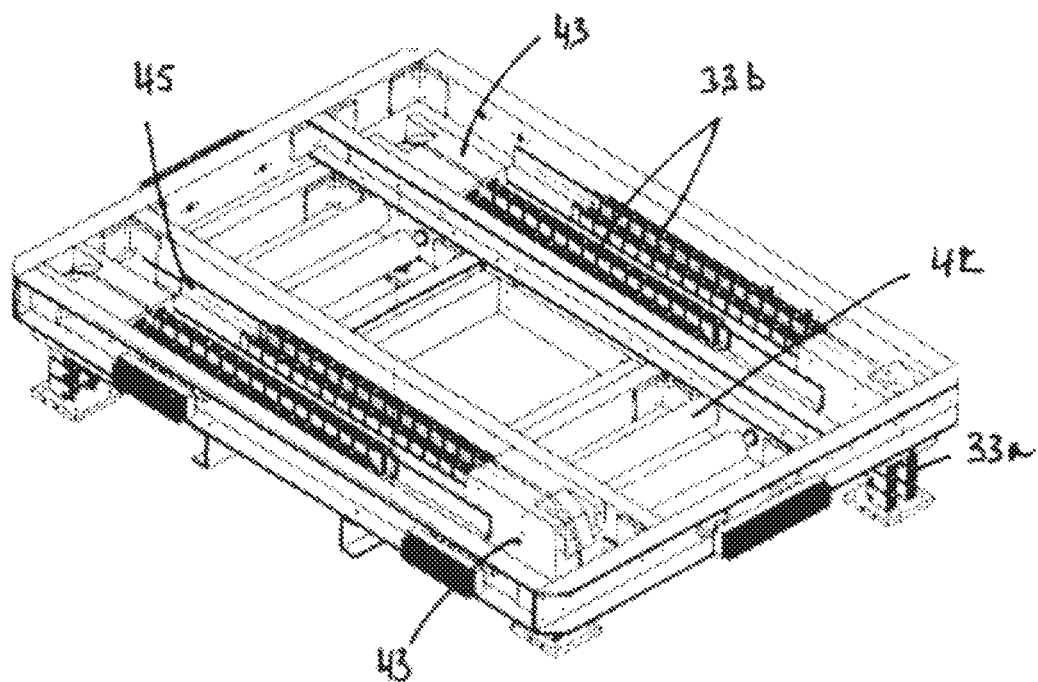
FIG. 9 shows a perspective view of an example of a device for actuating a mobile platform according to the invention, in the low position.
Figure 10:
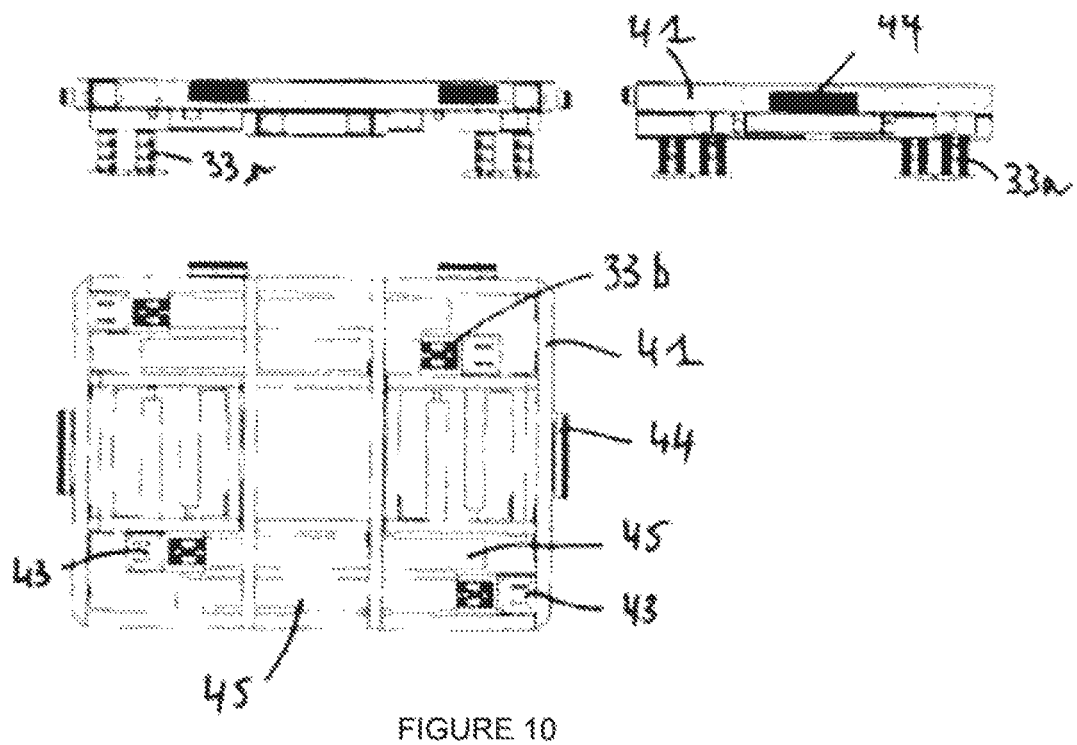
FIG. 10 shows top and side views of the actuating device according to the invention.

As shown in FIG. 8, the actuating device 40 according to the invention is based on the use of chains 23, 33 referred to as rigid, as described above. In reality, they are only perfectly rigid in a straight position, the links 1 or the elements 25 being aligned. They are also referred to as thrust chains. The actuating device according to the invention mainly has a load-bearing frame 41 made up of beams or profile sections made of a material compatible with the intended application. Housed in the frame 41 are one or more rigid chains 23, 33, which are mounted so as to be able to extend downward from the frame 41, so as to raise the frame 41 and the platform 45 carried thereby. Conversely, the chains can be pulled up in order to be partially housed in volumes of the frame that are provided to this end, thereby making it possible to lower the frame 41 and the platform 45 that it carries toward the ground, as shown in FIG. 9.

According to one embodiment, the frame 41 is made up of an assembly of U- or I-shaped profile sections for forming a structure for supporting a platform and for receiving rigid chains inside the frame when the rigid chains are folded up.

The frame 41 has a guide member 43 for each chain 33, for example a hollow guide casing into which the chain has to pass. When the frame 41 is rectangular and provided with four chains 33, as in the example shown, the guide casings 43 are fixed in the vicinity of the corners of the frame. Each guide casing 43 has a curved guide 47, as visible in FIG. 11, designed to impose a change in direction on each chain 33. Thus, the chain portion 33a that is extended toward the ground passes from a horizontal orientation to a vertical direction under the effect of the curved guide 47 of the guide casing 43. Conversely, the chain portion 33b that is folded up toward the inside of the frame passes from a vertical orientation to a horizontal orientation under the effect of the guide casing 43.

When the actuating device 40 according to the invention is intended for a swimming pool basin, the set of main components of the device, namely the rigid chains 33, the profile sections of the frame 41, and the guide casings 43, are made of a plastics material that is resistant to corrosive environments, for example nylon charged with glass fibers.

Fastened between the longitudinal internal profile sections of the frame are electric stepper motors 42. In the context of a swimming pool basin, they are chosen to be sealed at least to a level of sealing according to standard IP68. The driveshaft of the motors 42 passes through a longitudinal profile section that supports the motor and its end is provided with a sprocket 26, like the one shown in FIG. 7, situated inside each guide casing 43.

Preferably, the external profile sections of the frame are provided with brushes 44 made of plastics material provided with nylon bristles that ensure flexible separation and guidance of the frame 41 along the lateral walls 46 of the basin when the frame is moved by its vertical movement. This makes it possible to preserve the integrity of the walls 46 of the basin, and that of the actuating device 40. These brushes 44 are preferably fixed to the frame by means of stainless steel screws.

The frame 41 also has U-shaped rails 45 that serve to guide and stow the chains 23, 33 when they are moved into the frame.

Depending on the length of the rigid chains (and thus on the possible amplitude for the vertical movement of the mobile platform), two chains 33 can either be aligned and disposed in a single guide rail 45, or, as in the example shown in FIG. 9, be disposed in a staggered manner in separate guide rails.

In an environment of a basin filled with a liquid, such as a swimming pool basin, it is preferable for the foot 28 at the bottom end of the rigid chains 33 to be fastened to the bottom of the basin. Specifically, this makes it possible to compensate for the potential buoyancy of the load-bearing platform 45, notably when it is made of wood, and for the resistance provided by the water to the ascending or descending movement of the platform.

The actuating device 40 also has a low-voltage electrical box having end-of-travel sensors and a sealed electronic casing for controlling the operation of the motors 42. These elements are well known per se and will not be described in detail.

It can be seen that, by virtue of this actuating device 40 structure, the only connection from the actuating device to the outside of the basin is an electric power cable (not shown).

In order to make the structure of the actuating device 40 according to the invention clearer to understand, the different FIGS. 8 to 15 show the actuating device 40 and the main components thereof at different viewing angles, both in the extended position and in the folded-up position of the rigid chains.

Advantages of the Invention

The invention meets the aims set and makes it possible to obtain a system for actuating a mobile platform that is capable of lifting significant loads to great heights without any element protruding beyond the outline of the platform.

The actuating device according to the invention can be easily dimensioned and adapted to the actuation of vehicle lifts, elevators or the like.

An advantageous application of the invention is formed by the actuation of a mobile bottom for a basin, notably a swimming pool basin. Specifically, the system for actuating the mobile platform according to the invention rests only on the bottom slab of the basin and does not exert any force on the lateral walls of the basin, or on the external rims, unlike known platforms. It also follows that the actuating system can easily be used for basins that are not made of concrete, for example swimming pool basins made of wood.

Moreover, the system for actuating the mobile platform is entirely built-in and invisible, i.e. no element, cable, cylinder, protrudes beyond the mobile platform.

The mobile parts integrated into the frame (sprockets, rigid chains, motors) can be maintained easily via an access hatch made in the mobile platform.

The invention claimed is:

1. An actuating device for an approximately horizontal mobile platform that is able to be set in movement in a vertical direction between a high position and a low position, and having a frame supporting the platform, said actuating device having at least one rigid chain actuated by at least one motor secured to the frame, and a guide member for guiding the rigid chain between a position substantially extended in a direction of the ground and a position substantially stowed parallel to the frame, wherein said guide member for guiding the rigid chain is a guide casing that is integrated in the frame and has a curved guide ramp, one end of which is oriented horizontally in order to guide one end of the rigid chain parallel to the frame and to guide the other end of the rigid chain perpendicularly to the frame.

2. The actuating device as claimed in claim 1, wherein the frame has at least one hollow profile section in which one end of the chains is stowed.

3. The actuating device as claimed in claim 1, wherein the rigid chains are made up of unitary links or of chain elements that are juxtaposed and arranged such that the chain can be deformed between a straight extended position in which it is load-bearing and a position folded up inside the frame.

4. The actuating device as claimed in claim 3, wherein each unitary link of the rigid chain has a body that is approximately in the shape of a fork and is provided with a heel connected by a base to two parallel flanges separated by a space intended to receive the heel of an adjacent link, the heel and each flange having an orifice configured to receive a joint rotary pin for articulating a link with respect to an adjacent link of the rigid chain.

5. The actuating device as claimed in claim 4, wherein the base of each link has, on either side of the heel, two parallel shoulders configured to form a stop with respect to ends of the flanges of an adjacent link.

6. The actuating device as claimed in claim 4, wherein an articulation of two adjacent links is possible in an angular range limited to 90°.

7. The actuating device as claimed in claim 4, wherein end faces of the flanges of the links are parallel to faces of the shoulders and perpendicular to a compression force that is exerted on the links in a working position of the rigid chain.

8. The actuating device as claimed in claim 4, wherein each flange and the heel of the links have an approximately rectangular shape with a rounded corner situated in a vicinity of the rotary pin of the link.

9. The actuating device as claimed in claim 8, wherein distances between the rotary pin and two perpendicular sides of the flanges and two perpendicular sides of the heel of a link that are adjacent to the rotary pin are the same.

10. The actuating device as claimed in claim 9, wherein a radius of curvature of the rounded corners of the flanges and of the heel of a link is greater than a distance between the rotary pin and the two perpendicular sides of the flanges and the two sides of the heel that are adjacent to the rotary pin.

11. The actuating device as claimed in claim 4, wherein the rotary pin of a link is perpendicular to a main plane of symmetry of the link and offset toward a rear side of the link.

12. The actuating device as claimed in claim 4, wherein the heel of a link has an orifice that receives a threaded fastening screw, the end of the fastening screw is fitted into a tapped orifice in the rotary pin so as to secure the body of the link and the rotary pin thereof in terms of rotation.

13. The actuating device as claimed in claim 12, wherein the rotary pin of the links and the fastening screw thereof are made of stainless steel.

14. The actuating device as claimed in claim 4, wherein the body of a link is made of plastics material or of synthetic resin mixed with reinforcing fibers, notably glass fibers.

15. The actuating device as claimed in claim 3, wherein the rigid chain has a linear assembly of unitary links assembled such that a heel of one link is fitted into a space situated between flanges of an adjacent link, a rotary pin being inserted into orifices in the flanges of a link and an orifice in the heel of an adjacent link.

16. The actuating device as claimed in claim 3, wherein the rigid chain has a linear assembly of chain elements made up of several unitary links assembled in parallel on a single rotary pin, a part of the rotary pin remaining free in order to allow engagement with a sprocket for driving the chain.

17. The actuating device as claimed in claim 1, wherein the sides of the frame have elements for guiding the vertical movement of the platform along the walls of a basin, said elements being made up of brushes provided with bristles made of rot-proof plastics material.

18. The actuating device as claimed in claim 1, wherein the profile sections of the frame are made of synthetic resin reinforced with glass fibers.

19. The actuating device as claimed in claim 1, wherein the motors are sealed with a level of sealing in accordance with the standard IP68.

20. The actuating device as claimed in claim 1, wherein the platform and the frame have any shape that is adapted to the shape of a basin, for example a rectangular, square or free shape.

21. The actuating device as claimed in claim 1, wherein the driveshaft of the motor(s) is rotationally coupled to sprockets that mesh with the links or the chain elements.

22. A basin which has an actuating device for a mobile platform as claimed in claim 1.

* * * * *